(12) United States Patent
Kovach et al.

(10) Patent No.: US 10,966,362 B2
(45) Date of Patent: *Apr. 6, 2021

(54) AUXILIARY TOOL ASSEMBLY FOR AN AGRICULTURAL IMPLEMENT

(71) Applicant: CNH Industrial America LLC, New Holland, PA (US)

(72) Inventors: Michael G. Kovach, Morton, IL (US); Scott R. Faust, Philo, IL (US); Timothy R. Blunier, Danvers, IL (US); Gaylen J. Kromminga, Morton, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/718,384

(22) Filed: Dec. 18, 2019

(65) Prior Publication Data
US 2020/0120853 A1   Apr. 23, 2020

Related U.S. Application Data

(62) Division of application No. 15/587,467, filed on May 5, 2017, now Pat. No. 10,542,655.

(51) Int. Cl.
| A01B 29/06 | (2006.01) |
| A01B 49/02 | (2006.01) |
| A01B 63/16 | (2006.01) |
| A01B 73/00 | (2006.01) |
| A01B 63/14 | (2006.01) |

(52) U.S. Cl.
CPC .......... *A01B 49/027* (2013.01); *A01B 63/145* (2013.01); *A01B 63/16* (2013.01); *A01B 73/00* (2013.01); *A01B 29/06* (2013.01)

(58) Field of Classification Search
CPC ..... A01B 29/06; A01B 49/027; A01B 63/145; A01B 63/16
See application file for complete search history.

(56) References Cited

U.S. PATENT DOCUMENTS

| 9,332,687 | B2* | 5/2016 | Keigley | ............... A01B 63/008 |
| 10,542,655 | B2* | 1/2020 | Kovach | .................. A01B 73/00 |
| 2016/0081261 | A1* | 3/2016 | Paulessen | .......... A01B 63/1145 |
| | | | | 172/195 |

* cited by examiner

*Primary Examiner* — Gary S Hartmann
(74) *Attorney, Agent, or Firm* — Rebecca L. Henkel; Rickard K. DeMille

(57) ABSTRACT

An auxiliary tool assembly for an agricultural implement is configured to support a finishing tool(s) at a location at or adjacent to the aft end of the implement. The auxiliary tool assembly includes a support arm extending lengthwise between a proximal end and a distal end, with the proximal end of the support arm being pivotally coupled to a portion of the implement at or adjacent to its aft end so that the tool assembly is pivotable relative to the implement between a work position and a transport position. In addition, the finishing tool(s) is configured to be coupled to or otherwise supported relative to the ground by the support arm at a location between its proximal and distal ends. Moreover, the auxiliary tool assembly includes one or more surface-engaging wheels coupled to the distal end of the support arm.

4 Claims, 4 Drawing Sheets

AUXILIARY TOOL ASSEMBLY FOR AN AGRICULTURAL IMPLEMENT

CROSS REFERENCE TO RELATED APPLICATIONS

This divisional non-provisional utility patent application claims priority and benefit from U.S. application Ser. No. 15/587,467, filed May 5, 2017, entitled, "AUXILIARY TOOL ASSEMBLY FOR AN AGRICULTURAL IMPLEMENT," which is hereby incorporated by reference in its entirety herein.

FIELD OF THE INVENTION

The present subject matter relates generally to agricultural implements, such as tillage implements, and, more particularly, to an agricultural implement including an auxiliary tool assembly configured to be positioned at an aft end of the implement to support a finishing tool, such as a rolling basket, at a location aft of the various ground-engaging tools of the implement.

BACKGROUND OF THE INVENTION

It is well known that to attain the best agricultural performance from a piece of land, a farmer must cultivate the soil, typically through a tillage operation. Common tillage operations include plowing, harrowing, and sub-soiling. Farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

For example, modern farm practices demand a smooth, level field with small clods of soil in the fall and spring of the year. In this regard, residue must be cut, sized and mixed with soil to encourage the residue to decompose and not build up following subsequent passes of machinery. To achieve such soil conditions, it is known to utilize rolling baskets, such as crumbler reels, to produce smaller, more uniform clod sizes and to aid in the mixing of residue. Typically, such rolling baskets are configured to be raised relative to the ground when operating the implement in a transport mode. For example, in many instances, the rolling baskets are rigidly coupled to a portion of the implement frame such that the baskets are cantilevered relative to the ground when such portion of the implement frame is moved to a raised or transport position. However, such a configuration significantly increases the load applied through the implement during transport and also reduces the tongue weight for the implement. Similar disadvantages are also provided by other conventional rigidly coupled, rear-mounted finishers that are configured to be cantilevered when moved to the transport position. For example, in addition to the cantilevered loads, such finishers typically drastically reduce the tongue weight for the implement, which can present a safety hazard.

To address such cantilevered loading, it also known to provide ground-engaging wheels in operative association with rolling baskets. Unfortunately, to date, tool assemblies including ground-engaging wheels incorporated with rolling baskets have required that separate hydraulic actuators or lifting mechanisms be coupled to the wheels to allow the wheels to be raised and lowered relative to the ground independent of the baskets. Thus, such conventional tool assemblies are often quite expensive and can be complex in nature.

Accordingly, an improved auxiliary tool assembly for supporting a finishing tool(s) relative to the ground that addresses one or more of the above-describes issues of the prior art would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural implement for performing an operation relative to a surface of the ground. The implement may include a frame extending between a forward end and an aft end. The implement may also include a tool bar coupled to the frame so as to be positioned at or adjacent to its aft end, with the tool bar supporting a plurality of ground-engaging tools. In addition, the implement may include an auxiliary tool assembly pivotally coupled to the tool bar such that the auxiliary tool assembly is movable between a work position and a transport position. The auxiliary tool assembly may include a support arm including a proximal end pivotally coupled to the tool bar and a distal end opposite the proximal end. The auxiliary tool assembly may also include a wheel coupled to the distal end of the support arm, with the wheel being configured to be raised relative to the surface of the ground when the auxiliary tool assembly is at the work position. Moreover, the auxiliary tool assembly may include a finishing tool coupled to the support arm at a mounting location defined between the proximal and distal ends of the support arm. The finishing tool may be configured to engage the surface of the ground at a location aft of the ground-engaging tools supported by the tool bar when the auxiliary tool assembly is at the work position. Further, when the auxiliary tool assembly pivots from the work position to the transport position, the distal end of the support arm is lowered relative to the ground and the mounting location is raised relative to the ground such that the wheel is lowered into engagement with the surface of the ground while the finishing tool is raised relative to the surface of the ground.

In another aspect, the present subject matter is directed to an auxiliary tool assembly for use with an agricultural implement having a frame extending between a forward end and an aft end. The auxiliary tool assembly may include a support arm having a proximal end configured to be pivotally coupled to the frame and a distal end opposite the proximal end, with the support arm being configured to pivot relative to the frame to allow the auxiliary tool assembly to be moved between a work position and a transport position. The auxiliary tool assembly may also include a wheel coupled to the distal end of the support arm. The wheel may be configured to be raised relative to the surface of the ground when the auxiliary tool assembly is at the work position. In addition, the auxiliary tool assembly may include a finishing tool coupled to the support arm at a mounting location defined between the proximal and distal ends of the support arm. The finishing tool may be configured to engage the surface of the ground at a location forward of the wheel when the auxiliary tool assembly is at the work position. Moreover, when the auxiliary tool assembly pivots from the work position to the transport position, the distal end of the support arm may be lowered relative to the ground and the mounting location may be raised relative to the ground such that the wheel is lowered into engagement with the surface of the ground while the finishing tool is raised relative to the surface of the ground.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
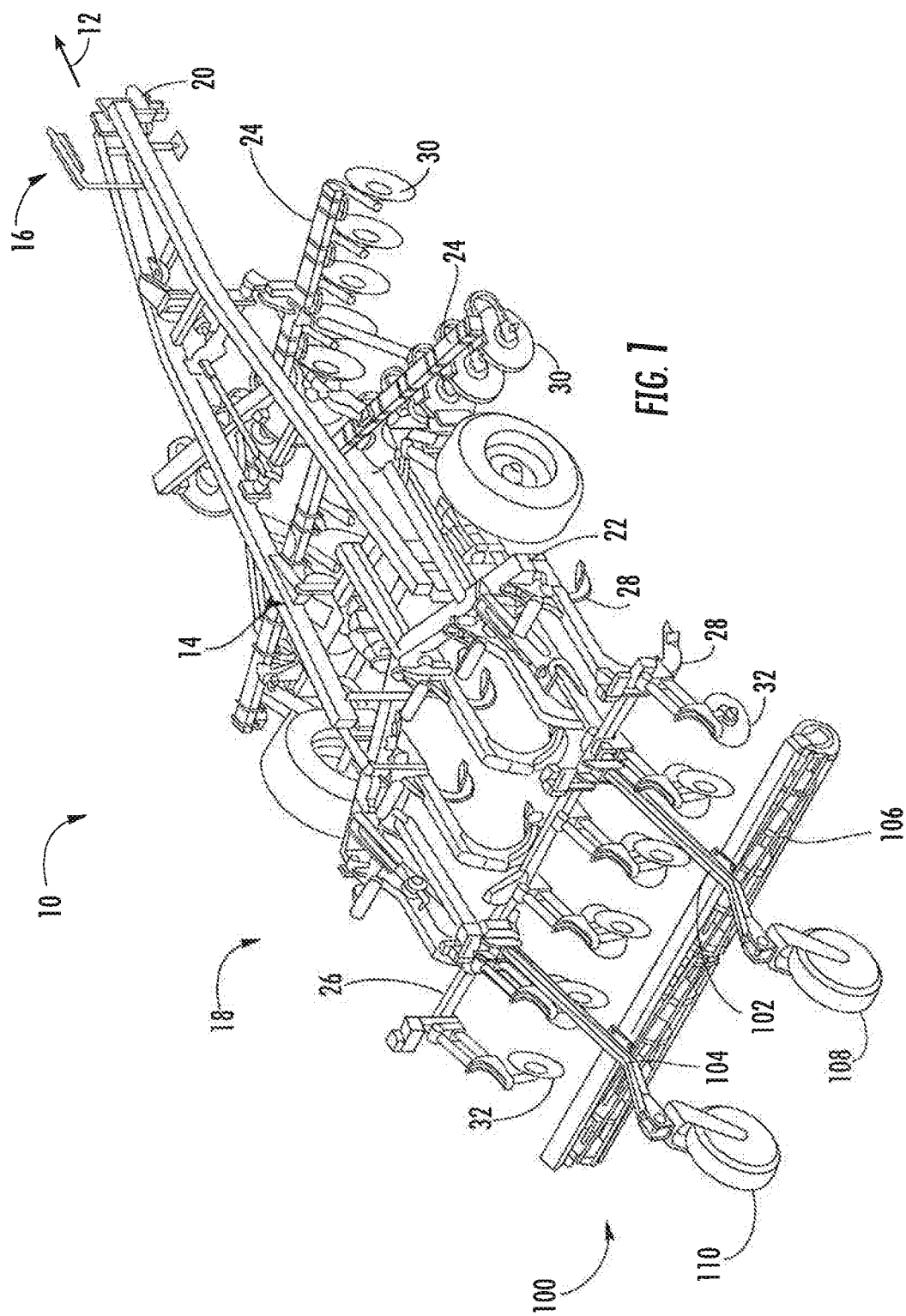
FIG. 1 illustrates a perspective view of one embodiment of an agricultural implement including an auxiliary tool assembly installed at its aft end in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an auxiliary tool assembly for an agricultural implement that is configured to support a finishing tool(s), such as a rotary tool, at a location at or adjacent to the aft end of the implement. Specifically, in several embodiments, the auxiliary tool assembly may include a support arm extending lengthwise between a proximal end and a distal end, with the proximal end of the support arm being pivotally coupled to a portion of the implement at or adjacent to its aft end (e.g., by being coupled to a tool bar positioned at or adjacent to the aft end of the implement) so that the tool assembly is pivotable or movable relative to the implement about a horizontal axis between a work position and a transport position. In such an embodiment, the finishing tool(s) may be configured to be coupled to or otherwise supported relative to the ground by the support arm at a location between its proximal and distal ends. Additionally, the auxiliary tool assembly may include one or more surface-engaging wheels coupled to the distal end of the support arm. As will be described below, the auxiliary tool assembly may be configured to be located at its work position when an aft portion of the implement is at a lowered position relative to the surface of the ground such that the finishing tool(s) engages the ground while the wheel(s) is maintained at a location above the ground. However, when the aft portion of the implement is raised relative to the surface of the ground, the auxiliary tool assembly may pivot from its work position to its transport position such that the wheel(s) is moved into engagement with the surface of the ground while the finishing tool(s) is raised to a location above the ground. As a result, the wheel(s) may support a significant portion of the weight of the auxiliary tool assembly when at the transport position, thereby avoiding a cantilevered condition for the tool assembly and also improving the tongue weight for the implement as compared to conventional rigidly coupled rear-mounted assemblies.

Referring now to FIG. 1, a perspective view of one embodiment of an agricultural implement 10 is illustrated in accordance with aspects of the present subject matter. In general, the implement 10 may be configured to be towed or pulled behind a work vehicle (not shown in FIG. 1), such as an agricultural tractor, in a forward direction of travel (e.g., as indicated by arrow 12 in FIG. 1). As shown, the implement 10 may include a main implement frame 14 extending lengthwise between a forward end 16 and an aft end 18. In one embodiment, the main implement frame 114 may include a hitch 20 or other suitable coupling located at its forward end 16 that is configured to couple the implement 10 to the associated work vehicle.

Figure 2:
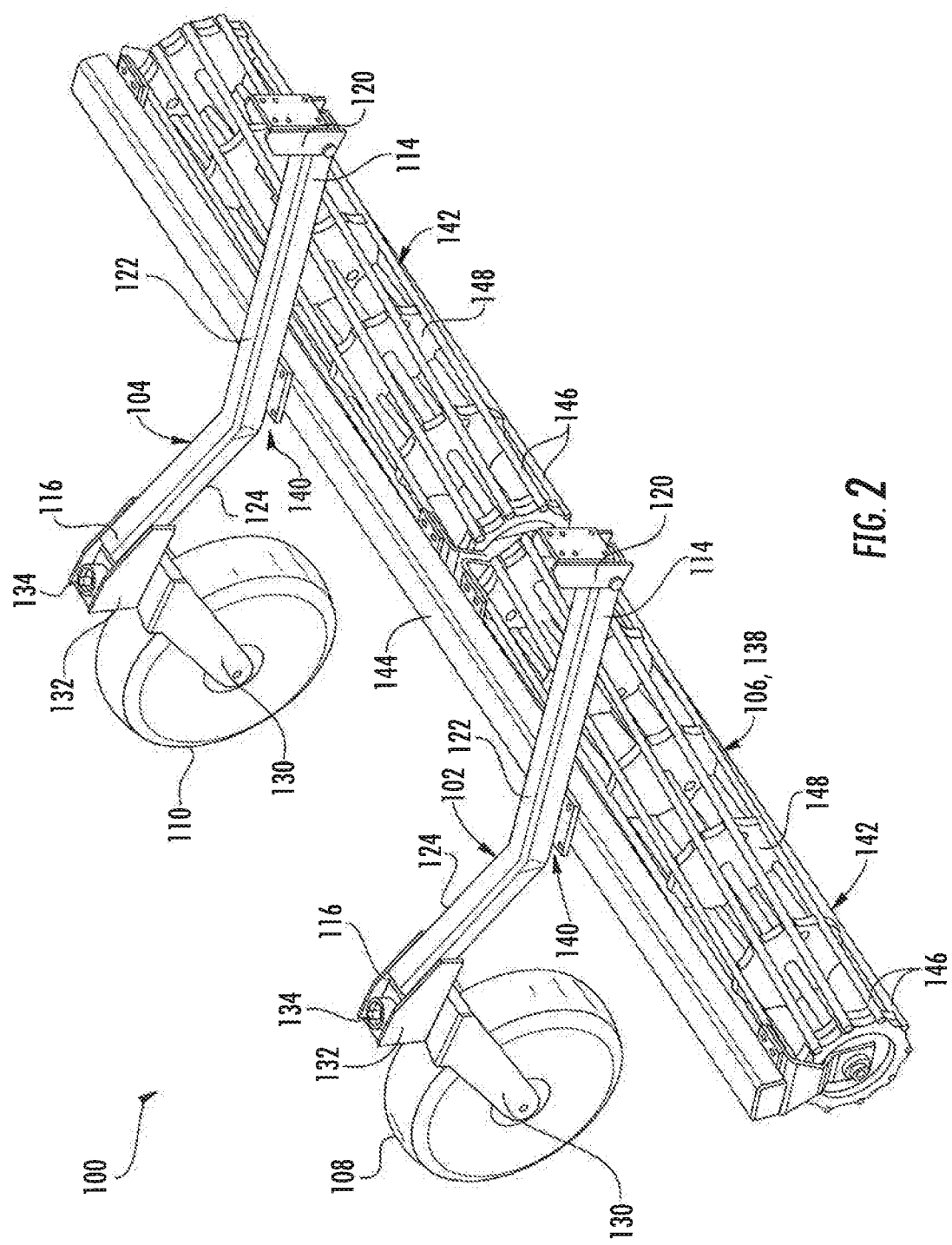
FIG. 2 illustrates a perspective view of one embodiment of the auxiliary tool assembly shown in FIG. 1 in accordance with aspects of the present subject matter.

Additionally, in several embodiments, the main implement frame 14 may be configured to support a plurality of frame sections or tool bars, which, in turn, support a plurality of ground-engaging tools, such as a plurality of shanks, disc blades, leveling blades, basket assemblies, and/or the like, that are configured to perform an operation (e.g., a tillage operation) within the field across which the implement 10 is being towed. For example, in one embodiment, the main implement frame 14 may generally function to support one or more central tool bars 22, one or more forward tool bars 24 positioned forward of the central tool bar(s) 22 in the direction of travel 12 of the implement 10, and one or more aft tool bars 26 positioned aft of the central tool bar(s) 22 in the direction of travel 12 of the implement 10. As shown in FIG. 2, in one embodiment, the central tool bar(s) 22 may correspond to one or more shank frames configured to support a plurality of ground-engaging shanks 28. However, in other embodiments, the central tool bar(s) 22 may be configured to support any other suitable ground-engaging tools.

Additionally, as shown in FIG. 2, in one embodiment, the forward tool bar(s) 24 may correspond to one or more disk frames configured to support various gangs or sets of disk blades 30. In such an embodiment, each disk blade 30 may, for example, include both a concave side (not shown) and a convex side (not shown). In addition, the various gangs of disk blades 30 may be oriented at an angle relative to the travel direction 12 of the implement 10 to promote more effective tilling of the soil. However, in other embodiments, the forward tool bar(s) 24 may be configured to support any other suitable ground-engaging tools.

Moreover, similar to the central and forward tool bar(s) 22, 24, the aft tool bar(s) 26 may also be configured to support a plurality of ground-engaging tools. For instance, in the illustrated embodiment, the aft tool bar(s) 26 is configured to support a plurality of leveling blades 32. However, in other embodiments, any other suitable ground-engaging tools may be coupled to and supported by the aft tool bar(s) 26, such as a plurality closing disks.

It should be appreciated that one or more of the various tool bars 22, 24, 26 and/or the ground-engaging tools 28, 30, 32 supported by such tool bars 22, 24, 26 may be configured to be moved or actuated relative to the ground between an implement work position (hereinafter referred to the "lowered position"), at which the ground-engaging tools 28, 30, 32 are configured to engage or penetrate the ground, and an implement transport position (hereinafter referred to as the "raised position"), at which the ground-engaging tools 28, 30, 32 are raised relative to the surface of the ground (and, thus, no longer engage the ground). For instance, as will be described below with reference to FIGS. 3 and 4, the aft tool bar(s) 26 may be configured to be moved from a lowered position to a raised position to raise the ground-engaging tools 32 supported by the tool bar 26 relative to the ground. As such, when the implement 10 is being towed in its transport mode (e.g., along a road), the various ground-engaging tools 28, 30, 32 of the implement 10 may be positioned above the surface of the ground.

Additionally, in accordance with aspects of the present subject matter, the implement 10 may also include an auxiliary tool assembly 100 supported at or adjacent to the aft end 18 of the main implement frame 14. For instance, as shown in FIG. 1, the auxiliary tool assembly 100 may be coupled to a portion of the aft tool bar(s) 26 and extend outwardly therefrom in a direction opposite the forward travel direction 12 of the implement 10 such that portions of the auxiliary tool assembly 100 are located aft of the ground-engaging tools 32 supported by the aft tool bar(s) 26. The various components of the auxiliary tool assembly 100 will generally be described below with reference to FIGS. 2-4.

It should also be appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 3:
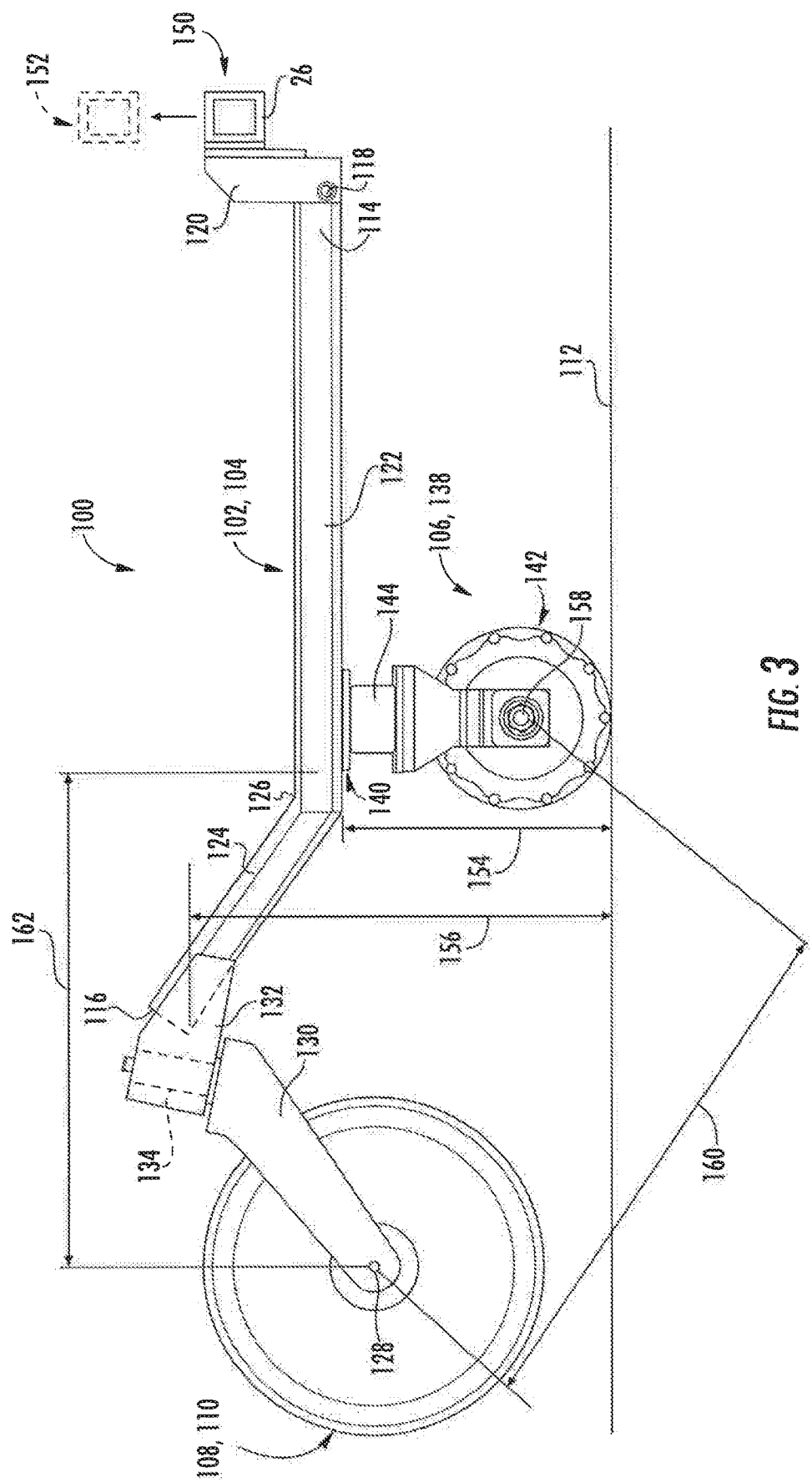
FIG. 3 illustrates a side view of the auxiliary tool assembly shown in FIG. 2, particularly illustrating the auxiliary tool assembly in a work position such that a finishing tool(s) of the assembly is engaging the ground and a wheel(s) of the assembly is raised relative to the ground.
Figure 4:
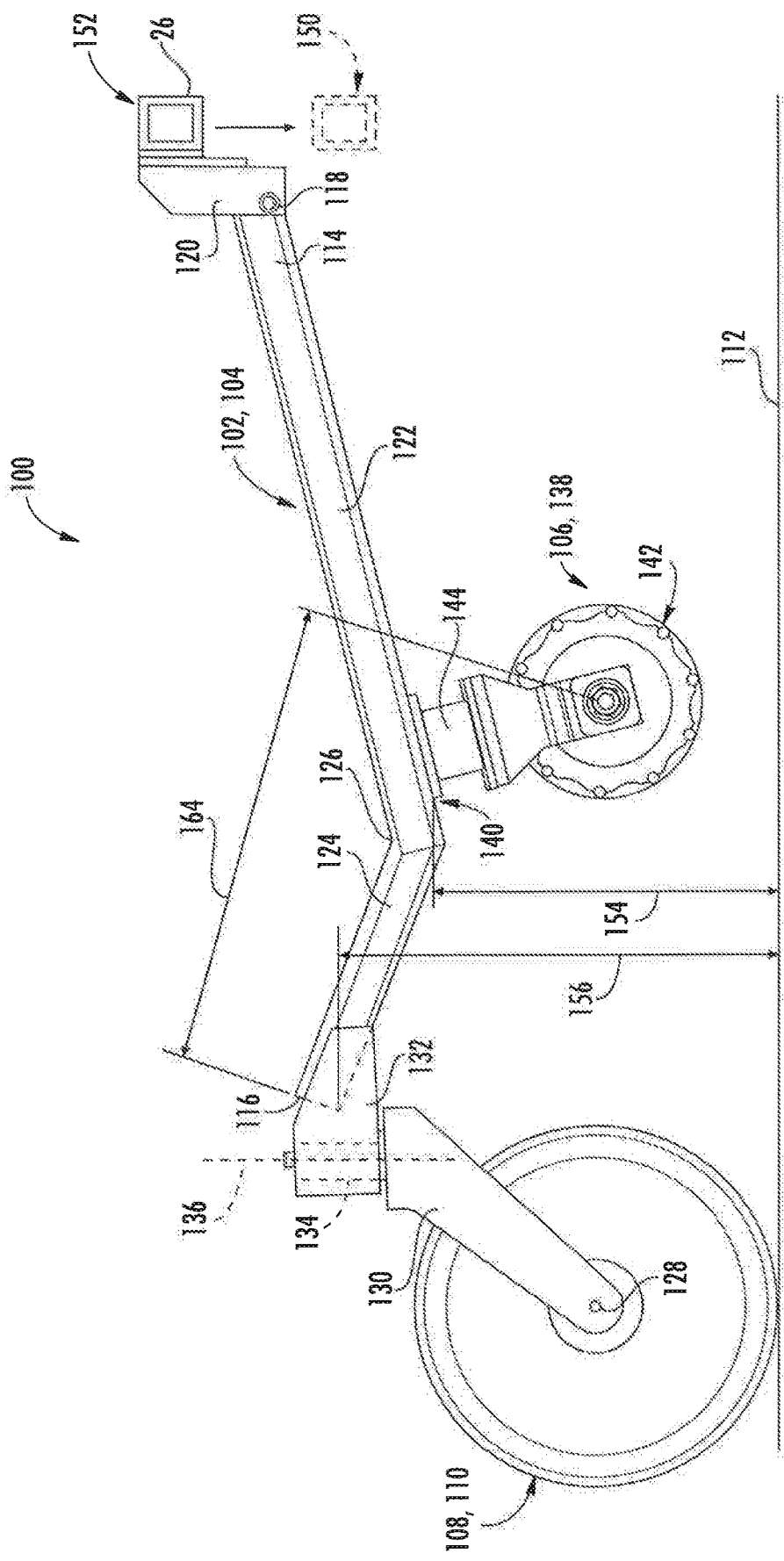
FIG. 4 illustrates another side of the auxiliary tool assembly shown in FIG. 2, particularly illustrating the auxiliary tool assembly after it has been moved from the work position shown in FIG. 3 to a transport position such that the finishing tool(s) is raised relative to ground and the wheel(s) is contacting the ground.

Referring now to FIGS. 2-4, several views of one embodiment of the auxiliary tool assembly 100 described above with reference to FIG. 1 are illustrated in accordance with aspects of the present subject matter. Specifically, FIG. 2 illustrates a perspective view of the auxiliary tool assembly 100. Additionally, FIGS. 3 and 4 illustrate side views of the auxiliary tool assembly 100, particularly illustrating the tool assembly 100 at both a work position when the aft tool bar(s) 26 of the implement 10 is at its lowered position (FIG. 3) and a transport position when the tool bar(s) 26 is at its raised position (FIG. 4). It should be appreciated that, in general, the auxiliary tool assembly 100 will be described herein with reference to the implement 10 shown in FIG. 1. However, those of ordinary skill in the art should appreciate that the disclosed tool assembly 100 may be utilized with agricultural implements having any other suitable implement configuration.

As particularly shown in FIG. 2, the auxiliary tool assembly 100 may generally include one or more support arms 102, 104 configured to support one or more finishing tools 106 and one or more associated surface-engaging wheels 108, 110 relative to the surface of the ground 112 (FIGS. 3 and 4). For instance, in the illustrated embodiment, the tool assembly 100 includes a first support arm 102 and a second support arm 104. However, in other embodiments, the tool assembly 100 may include any other suitable number of support arms, such as a single support arm or three or more support arms.

In general, each support arm 102, 104 may be configured to extend lengthwise between a proximal end 114 and a distal end 116, with the proximal end 114 being configured to be pivotally coupled to a portion of the aft tool bar(s) 26 of the implement 10 about a substantially horizontally oriented pivot point 118 (FIGS. 3 and 4). For example, as shown in FIGS. 2-4, a suitable mounting bracket 120 or other pivotal mounting feature may be secured between the proximal end 114 of each support arm 102, 104 and the tool bar(s) 26 to allow the support arms 102, 104 to be pivotally coupled to the tool bar(s) 26. As will be described below, such a pivotal connection between the support arms 102, 104 and the tool bar(s) 26 may allow the support arms 102, 104 to pivot relative to the tool bar(s) 26 about the horizontal pivot point 118 as the tool bar(s) 26 is moved between its lowered and raised positions. Additionally, as shown in FIGS. 3 and 4, each support arm 102, 104 may be configured to extend from its proximal end 114 outwardly from the tool bar(s) 26 such that the distal end 116 of each support arm 102, 104 is spaced apart from the tool bar(s) 26 in a direction opposite the forward travel direction 12 of the implement 10.

In one embodiment, each support arm 102, 104 may include two or more arm portions provided at an angled orientation relative to one another. For instance, as shown in the illustrated embodiment, each support arm 102, 104 may include a first arm portion 122 and a second arm portion 124, with the second arm portion 124 being angled relative to the first arm portion 122. Specifically, as shown in FIGS. 3 and 4, the first arm portion 122 may extend lengthwise between the proximal end 114 of each support arm 102, 104 and a bend 126 defined between the first and second arm portions 122, 124, with the second arm portion 124 extending lengthwise from the bend 126 to the distal end 116 of each support arm 102, 104. In such an embodiment, the first and second arm portions 122, 124 may be formed integrally with each other. However, in other embodiments, the first and second arm portions 122, 124 may correspond to separate components. In such an embodiment, the first and second arm portions 122, 124 may be configured to be rigidly coupled to each other (e.g., to form a joint at the location of the bend 126) such that the first and second arm portions 122, 124 are angled relative to each other. As will be described below, the angled orientation of the arm portions 122, 124 of each support arm 102, 104 may facilitate raising the finishing tool(s) 106 relative to the surface of the ground 112 while lowering the wheel(s) 108, 110 relative to the ground 112 when the tool bar(s) 26 is moved from its lowered portion to its raised position.

As indicated above, the auxiliary tool assembly 100 may also include one or more surface-engaging wheels. Specifically, as shown in FIG. 2, the tool assembly 100 may include a pair of surface-engaging wheels coupled to the support arms 102, 104, such as a first wheel 108 coupled to the distal end 116 of the first support arm 102 and a second wheel 110 coupled to the distal end 116 of the second support arm 104. However, in other embodiments, the tool assembly 100 may include any other suitable number of wheels coupled to each support arm 102, 104, such as two or more wheels coupled to each support arm 102, 104.

It should be appreciated that, as used herein, the term "wheel" is used broadly and is intended to cover various embodiments of rolling support devices, including a wheel with or without a tire provided in associated therewith. For example, in several embodiments, the term "wheel" may correspond to a wheel configured to directly contact or engage the ground around its outer perimeter or the term "wheel" may correspond to a wheel configured to contact or engage the ground via a tire or suitable inflatable member installed around its outer perimeter.

In several embodiments, each wheel 108, 110 may be supported for rotation relative to its adjacent support arm 102, 104 about a rotational axis 128 (FIGS. 3 ad 4) via a support bracket 130. For instance, the support bracket 130 may correspond to a wheel fork or other similar structure such that the support bracket 130 includes side portions extending along either side of the corresponding wheel 108, 110 that receive a shaft or pin defining the rotational axis 128 of the wheel 108, 110. Additionally, as shown in FIGS. 2-4, the support bracket 130 associated with each wheel 108, 110 may, in turn, be coupled to the distal end 116 of the adjacent support arm 102, 104 via a corresponding mounting bracket 132. In one embodiment, each support bracket 130 may be castered or otherwise pivotally coupled to the adjacent mounting bracket 132 to allow its associated wheel 108, 110 to pivot or swivel relative to the mounting bracket 132 (and, thus, relative to its respective support arm 102, 104). For instance, as shown in FIG. 3, the support bracket 130 may include a pin connector or post 134 at its upper end that is configured to allow the support bracket 130 to pivot or swivel relative to the mounting bracket 132 about a fixed swivel axis (e.g., as indicated by line 136 in FIG. 4). Thus, as the implement 10 is turned as it is being towed by an associated work vehicle, the wheels 108, 110 may be allowed to swivel or pivot about the fixed swivel axis 136 such that the orientation of the rotational axis 128 of each wheel 108, 110 can vary relative to the support arms 102, 104. Such swiveling or pivoting of the wheels 108, 110 will allow the wheels 108, 110 to follow the implement 10 without sliding side-to-side.

Moreover, as indicated above, the auxiliary tool assembly 100 may also include one or more finishing tools 106 supported by the support arms 102, 104. For instance, as shown in the illustrated embodiment, the finishing tool(s) 106 may correspond to a basket assembly 138 coupled to each support arm 102, 104 at a mounting location 140 defined on each support arm 102, 104 between its proximal and distal ends 114, 116, such as by coupling the basket assembly 138 to the first arm portion 122 of each support arm 102, 104 at a mounting location 130 directly forward of the bend 126 defined between the first and second arm portions 122, 124 of each support arm 102, 104. In such an embodiment, the basket assembly 138 may include one or more rolling baskets 142 secured to the support arms 102, 104 via one or more mounting bars 144, such as one or more crumbler baskets including a rotary reel having a plurality of flat bars 146 attached to laterally spaced apart support plates 148. However, in other embodiments, the finishing tool(s) 106 may correspond to any other suitable rotary tool(s) known in the art that is configured to roll along or otherwise rotate as the tool(s) engages the ground 112. Alternatively, the finishing tool(s) 106 may correspond to any other suitable finisher-type tool, including any suitable non-rotary ground-engaging tools.

As particularly shown in FIGS. 3 and 4, the finishing tool(s) 106 may be coupled to the support arms 102, 104 such that the tool(s) 106 is configured to engage the ground 112 at a location forward of the wheels 108, 110 and aft of the tool bar(s) 26. For instance, as shown in FIG. 1, the finishing tool(s) 106 may be configured to be disposed between the wheels 108, 110 of the auxiliary tool assembly 110 and the aft-most ground-engaging tools 32 supported by the implement frame 14. Thus, given its relative positioning to the other ground-engaging tools 28, 30, 32 of the implement 10, the finishing tool(s) 106 may be used as the final stage of field conditioning as the implement 10 is moved across the field. In particular, when the finishing tool(s) 106 includes one or more rolling baskets 142, such as one or more crumbler baskets, the baskets 142 may serve to create a more smooth finish for the field being processed via the implement 10. For instance, the baskets 142 may produce smaller, more uniform clods size, remove soil from roots, and further aid in the mixing of residue, all of which will lead to improved soil conditions for plant germination.

As indicated above, given the pivotal connection between the support arms 102, 104 and the tool bar(s) 26, each support arm 102, 104 may be configured to pivot relative to the tool bar(s) 26 about its associated horizontal pivot point 118 as the tool bar(s) 26 is moved between its lowered position 150 (e.g., as indicated by the position shown in solid lines in FIG. 3 and the position shown in dashed lines in FIG. 4) and its raised position 152 (e.g., as indicated by the position shown in dashed lines in FIG. 3 and the position shown in solid lines in FIG. 4). Such pivoting of the support arms 102, 104 may, in turn, allow the disclosed auxiliary tool assembly 100 to be moved relative to the tool bar(s) 26 between a work position (FIG. 3) and a transport position (FIG. 4) as the tool bar(s) 26 is moved between its lowered and raised positions 150, 152. As will be described below, as the auxiliary tool assembly 100 transitions from its work position to its transport position, the finishing tool(s) 106 may be raised relative to the surface of the ground 112 (i.e., such that the finishing tool(s) 106 is no longer contacting the ground 112) while the wheels 108, 110 are lowered relative to the ground 112 (i.e., such that the wheels 108, 110 come into contact with and begin rotating relative to the ground 112). Thus, as opposed to being cantilevered off of the aft end of the implement 10 such that the entire weight of the auxiliary tool assembly 100 is applied through the tool bar(s) 26, at least a portion of the weight of the tool assembly 100 will be carried by the wheels 108, 110 when the tool bar(s) 26 is moved to its raised position 152.

For example, as shown in FIG. 3, when the tool bar(s) 26 is at its lowered position 150, the finishing tool(s) 106 may be configured to contact or roll across the surface of the ground 112, thereby allowing the tool(s) 106 to create a smooth field finish at the rear of the implement 10. In addition, when the tool bar(s) 26 is at its lowered position 150, the wheels 108, 110 may be configured to be raised relative to the surface of the ground 112, thereby preventing the wheels 108, 110 from hindering the performance of the finishing tool(s) 106. As particularly shown in FIG. 3, such positioning of the finishing tool(s) 106 and the wheels 108, 110 relative to the surface of the ground 112 may be achieved, at least in part, due to the configuration of the support arms 102, 104. For example, in the illustrated embodiment, when the auxiliary tool assembly 100 is located at the work position, the first arm portion 122 of each support arm 102, 104 may be oriented relative to the surface of the ground 112 such that the mounting location 140 for the finishing tool(s) 106 on each support arm 102, 104 is spaced apart from the ground 112 by a first vertical distance 154 so as to allow the finishing tool(s) 106 to be maintained in contact with the ground 112. In contrast, the second arm portion 124 of each support arm 102, 104 may be oriented relative to the surface of the ground 112 such that the distal end 116 of each support arm 102, 104 is spaced apart from the ground 112 by a second vertical distance 156 so as to allow the wheels 108, 110 to be maintained above the ground 112. Specifically, as shown in FIG. 3, the second arm portion 124 is angled upwardly relative to the first arm portion 122 in a direction away from the surface of the ground 112 such that the wheels 108, 110 are suspended relative to the ground 112 while the finishing tool(s) 106 is contacting the ground 112.

However, as shown in FIG. 4, when the tool bar(s) 26 is moved from its lowered portion 150 to its raised position 152, the support arms 102, 104 may be configured to pivot downwardly relative to the tool bar(s) 26 about their horizontal pivot points 118 (e.g., in a counter-clockwise direction relative to the view of FIG. 4) such that the finishing tool(s) 106 is raised relative to the surface of the ground 112 while the wheels 108, 110 are lowered relative to the ground 112. Specifically, as the tool bar(s) 26 is being raised (e.g., in the direction of the arrow shown in FIG. 3), such pivoting of the support arms 102, 104 may result in the portions of the support arms 102, 104 defining the mounting locations 140 for the finishing tool(s) 106 being raised relative to the ground 112 and the distal ends 116 of the support arms 102, 104 being lowered relative to the ground 112. For example, as shown in FIG. 4, when the auxiliary tool assembly 100 is moved to the transport position, the first vertical distance 154 defined between the mounting locations 140 and the surface of the ground 112 may be increased such that the finishing tool(s) 106 are raised above the ground surface. Similarly, as the support arms 102, 104 pivot towards the transport position, the second vertical distance 156 may be decreased as the distal end 116 of each support arm 102, 104 is moved closer to the ground 112 such that the wheels 108, 110 contact and begin to roll along the ground 112, thereby allowing the wheels 108, 110 to at least partially support the weight of the auxiliary tool assembly 100.

It should be appreciated that, given the configuration of the disclosed auxiliary tool assembly 100, the finishing tool(s) 106 and the wheels 108, 110 may be moved into and out of engagement with the ground 112 without requiring a separate actuator (e.g., a hydraulic actuator) for actuating the wheels 108, 110 and/or the finishing tool(s) 106 relative to the ground 112. As such, the relative spacing between the finishing tool(s) 106 and the wheels 108, 110 may remain fixed. For instance, assuming that the wheels 108, 110 are maintained at a given swivel orientation relative to the distal ends 116 of the support arms 102, 104 such that the rotational axis 128 of the wheels 108, 110 is maintained parallel to a corresponding rotational axis 158 of the finishing tool(s) 106, a distance 160 (FIG. 3) defined between such rotational axes 128, 158 will remain fixed as the auxiliary tool assembly 100 is moved between its work and transport positions.

Additionally, given the configuration of the disclosed auxiliary tool assembly 100, the relative spacing between the support arms 102, 104 and the finishing tool(s) 106 and between the support arms 102, 104 and the wheels 108, 110 may remain fixed. For instance, assuming that the wheels 108, 110 are maintained at a given swivel orientation relative to the distal ends 116 of the support arms 102, 104 such that the rotational axis 128 of the wheels 108, 110 is maintained parallel to the rotational axis 158 of the finishing tool(s) 106, a distance 162 (FIG. 3) defined between the rotational axis 128 of the wheels 108, 110 and the mounting locations 140 for the finishing tool(s) 106 on the support arms 102, 104 will remain fixed as the auxiliary tool assembly 100 is moved between its work and transport positions. Similarly, a distance 164 (FIG. 4) defined between the rotational axis 158 of the finishing tool(s) 106 and the distal ends 116 of the support arms 102, 104 will remain fixed as the auxiliary tool assembly 100 is moved between its work and transport positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An auxiliary tool assembly for use with an agricultural implement including a frame extending between a forward end and an aft end, the auxiliary tool assembly comprising:
   a support arm including a proximal end configured to be pivotally coupled to the frame and a distal end opposite the proximal end, the support arm configured to pivot relative to the frame to allow the auxiliary tool assembly to be moved between a work position and a transport position, the support arm including a first arm portion and a second arm portion, the first arm portion being angled relative to the second arm portion, and the first arm portion extends between the proximal end of the support arm and a bend defined in the support arm, the second arm portion extending between the bend and the distal end of the support arm;
   a wheel coupled to the distal end of the support arm, the wheel configured to be raised relative to the surface of the ground when the auxiliary tool assembly is at the work position; and
   a finishing tool coupled to the support arm at a mounting location defined between the proximal and distal ends of the support arm, the finishing tool being configured to engage the surface of the ground at a location forward of the wheel when the auxiliary tool assembly is at the work position,
   wherein, when the auxiliary tool assembly pivots from the work position to the transport position, the distal end of the support arm is lowered relative to the ground and the mounting location is raised relative to the ground such that the wheel is lowered into engagement with the surface of the ground while the finishing tool is raised relative to the surface of the ground.

2. The auxiliary tool assembly of claim 1, wherein the finishing tool comprises a rotary tool.

3. The auxiliary tool assembly of claim 1, wherein the wheel is coupled to the distal end of the support arm via a support bracket, the support bracket being configured to swivel relative to the distal end of the support arm.

4. The auxiliary tool assembly of claim 1, wherein the finishing tool is coupled to the first arm portion of the support arm and the wheel is coupled to the second arm portion of the support arm, the second arm portion being angled away from the surface of the ground relative to the first arm portion when the auxiliary tool assembly is at the work position.

* * * * *